United States Patent
Kamata et al.

(10) Patent No.: US 8,174,403 B2
(45) Date of Patent: May 8, 2012

(54) METHODS AND APPARATUS FOR TELEMETRY AND POWER DELIVERY

(75) Inventors: Masahiro Kamata, Kawasaki (JP); Yuji Hosoda, Berkeley, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1194 days.

(21) Appl. No.: 11/948,853

(22) Filed: Nov. 30, 2007

(65) Prior Publication Data

US 2009/0140879 A1    Jun. 4, 2009

(51) Int. Cl.
*G01V 3/00* (2006.01)
(52) U.S. Cl. ............... 340/853.2; 340/853.1; 340/854.3; 340/854.9; 73/152.43; 73/152.46; 166/77.2
(58) Field of Classification Search ............... 340/853.1, 340/853.2, 854.2, 854.9, 855.1, 855.2, 855.8; 166/250.01, 77.2, 75.11; 73/152.01–152.62; 367/81–85
See application file for complete search history.

(56) References Cited

U.S. PATENT DOCUMENTS

| | | | | |
|---|---|---|---|---|
| 5,826,654 | A | * 10/1998 | Adnan et al. | 166/250.01 |
| 6,252,518 | B1 | * 6/2001 | Laborde | 340/855.4 |
| 6,615,916 | B1 | 9/2003 | Vachon | |
| 7,253,671 | B2 | * 8/2007 | Hall et al. | 327/165 |
| 2007/0225944 | A1 | * 9/2007 | Knutsen | 702/187 |

FOREIGN PATENT DOCUMENTS

| | | |
|---|---|---|
| EP | 0028296 | 11/1986 |
| GB | 2401295 | 7/2005 |
| JP | 1993022323 | 1/1993 |

* cited by examiner

*Primary Examiner* — George Bugg
*Assistant Examiner* — Franklin Balseca
(74) *Attorney, Agent, or Firm* — Jianguang Du; Jody DeStefanis; Jeff Griffin

(57) ABSTRACT

Remote sensing systems are provided including a recorder, a cable network and a plurality of downhole sensor nodes. The cable network comprises a first cable and a second cable. The first and second cables form a loop. The recorder and the plurality of downhole sensor nodes are connected to the cable network in series. The first cable delivers power to the nodes and the second cable comprises a power return and closes the loop to the recorder.

25 Claims, 13 Drawing Sheets

METHODS AND APPARATUS FOR TELEMETRY AND POWER DELIVERY

FIELD

The present disclosure relates generally to methods and apparatus for powering and communicating with tools. More particularly, the present disclosure relates to methods and apparatus for remotely powering and communicating with tools such as acquisition systems for downhole, subsea or land applications.

BACKGROUND

Logging and monitoring boreholes has been done for many years to enhance and observe recovery of oil and gas deposits. In the logging of boreholes, one method of making measurements underground includes attaching one or more tools to a wireline connected to a surface system. The tools are then lowered into a borehole by the wireline and drawn back to the surface ("logged") through the borehole while taking measurements. The wireline is usually an electrical conducting cable with command/synchronization/power/data transmission or "telemetry" capability. Similarly, permanent monitoring systems are established with permanent sensors that are also generally attached to an electrical cable.

In some seismic acquisition systems, a telemetry based seismic recorder sends commands and a timing or clock signal to remote acquisition units (e.g. nodes in network usually arranged in series) on a twisted wire pair as an electrical conducting cable. Each node synchronizes its own clock to the in coming clock signal from the twisted wire pair and sends data on another twisted wire pair, often in real time. Each node in these systems is powered by its own local battery, so there is no need to supply power from the recorder.

However, if a portion of the wire pair, a connector pin, node electronics, or a battery fails, all nodes beyond the failed node lose communication to the recorder. Battery failures may be eliminated by providing power via the twisted pair, but faults resulting from connectors, node electronics, or wire pair problems remain. Further, electrical resistance in the cable causes a drop in line voltage as node distance from the recorder increases. Voltage drops in the cable may make it difficult to effectively connect many nodes over a long distance. Moreover, as mentioned above, connectors are other sources of failures. Therefore, from the reliability standpoint, the fewer conductors and connector pins, the better.

SUMMARY

The present specification provides some embodiments directed to improving, or at least reducing, the effects of one or more the above-identified problems. In one of many possible embodiments, a remote sensing system is provided. The remote sensing system comprises a recorder, a cable network, the cable network comprising, a first cable, a second cable, the first and second cables forming a loop, a plurality of downhole sensor nodes, the recorder and the plurality of downhole sensor nodes being connected to the cable network in series, the first cable delivers power to the nodes and the second cable comprising a power return and closes the loop to the recorder. In one embodiment, each of the first and second cables comprise cables including at least one core, the at least one core of the first cable delivering power to the nodes, the at least one core of the second cable comprising a power return and closes the loop to the recorder.

In one embodiment of the remote sensing system, each of the first and second cables further comprises a conductor member, the member of the first or second cable comprising a power return and closes the loop to the recorder in a fault condition. In one embodiment, the plurality of downhole sensor nodes comprise one or more switches capable of re-routing power and data transmission. In one embodiment, the switches of the nodes are operable to direct data transmission in one or more directions. In one embodiment, the switches of the nodes direct data transmission along the first and second cables from the nodes to the recorder in parallel. In one embodiment, the switches of each of the plurality of downhole sensor nodes are programmed to return power via the same cable providing power and send data in a direction opposite of a command and/or synchronization signal if a fault is detected between nodes.

One embodiment of the remote sensing system further comprises cable connections between at least two non-adjacent nodes selectively connectable by the switches to route power and data transmission in the event of multiple faults. Another embodiment of the remote sensing system further comprises cable connections between at least four non-adjacent nodes selectively connectable by the switches to route power and data transmission in the event of multiple faults. In one embodiment, the sensor nodes each comprise a permanent seismic sensor and a telemetry module. In one embodiment, the first and second cables are formed by a quad cable, and the at least one core of the first and second cables are isolated from each other.

One aspect provides a remote sensing system comprising a wellhead, a recorder, a cable network penetrating the wellhead, the cable network comprising a first telemetry and power cable, a second telemetry and power cable, the first and second telemetry and power cables forming a loop, a plurality of downhole nodes, each node comprising a seismic sensor and a telemetry module connected to the cable network in series, the first cable delivers power to the downhole nodes and the second cable comprising a power return and closes the loop to the recorder.

In one embodiment, the plurality of downhole nodes comprise one or more switches capable of altering a power loop configuration and changing data transmission routing from the seismic sensor. In one embodiment, the power is transmitted along the first cable to the plurality of downhole nodes and the switches are programmed to close the loop via the telemetry and power cable under normal operating conditions. In one embodiment, the power is transmitted along both the first and second cables to the plurality of downhole nodes and the switches are programmed to close a first power loop of the first telemetry and power cable and close a second power loop of the second telemetry and power cable in the event of a fault between adjacent downhole nodes. In one embodiment, the switches are programmed to route seismic sensor data from the telemetry modules via the first and second cables in a direction opposite of a command and/or synchronization signal.

One embodiment of the remote sensing system further comprises cable connections between at least two non-adjacent downhole nodes selectively connectable by the switches to re-route power and data transmission in the event of multiple faults between nodes. Another embodiment of the remote sensing system further comprises third and fourth telemetry and power cables connected between at least four non-adjacent downhole nodes selectively connectable by the switches to route power and data transmission in the event of multiple faults between nodes. In one embodiment, power and synchronization signals are delivered downhole together.

One aspect comprises a method of providing power and data transmission in a remote sensing system, comprising delivering power downhole to a plurality of nodes arranged in series along a first cable, monitoring for faults between adjacent nodes, if there are no faults detected: closing a first power loop via a second cable connected to the nodes, if there is one fault detected between adjacent nodes, closing the first power loop via the first cable at the fault, delivering power downhole to some of the plurality of nodes with the second cable, closing a second power loop via a second cable at the fault. If there are no faults detected, the method includes transmitting data uphole in parallel via the first and second cables. If there is one fault detected between adjacent nodes, the method includes transmitting data from the nodes proximal of the fault uphole via the first cable, and transmitting data from the nodes distal of the fault uphole via the second cable. In one embodiment, if there are no faults detected: transmitting data uphole in series in a single direction opposite the direction of a command and/or synchronization signal via the first and second cables. One embodiment of the method further comprises connecting non-adjacent nodes with at least one cable. If there are faults detected between two or more different sets of adjacent nodes, the method further comprises switching node connections to interconnect non-adjacent nodes with the at least one cable, re-routing power and data transmission around each fault.

One aspect provides a method of measuring propagation delay in a remote sensing system. The method comprises providing a recorder, providing a cable network, the cable network comprising a first cable and a second cable to form a loop, providing a plurality of downhole sensor nodes, connecting the recorder and the plurality of downhole sensor nodes to the cable network in series, closing the loop to the recorder by the first cable, measuring start time for sending data to the plurality of downhole sensor nodes from the recorder, measuring arrival time for the sent data to return to the recorder, calculating the propagation delay using the start time and the arrival time.

Additional advantages and novel features will be set forth in the description which follows or may be learned by those skilled in the art through reading these materials or practicing the principles described herein.

BRIEF DESCRIPTION OF THE DRAWINGS

The accompanying drawings illustrate certain embodiments and are a part of the specification. Together with the following description, the drawings demonstrate and explain certain principles.

Figure 1:
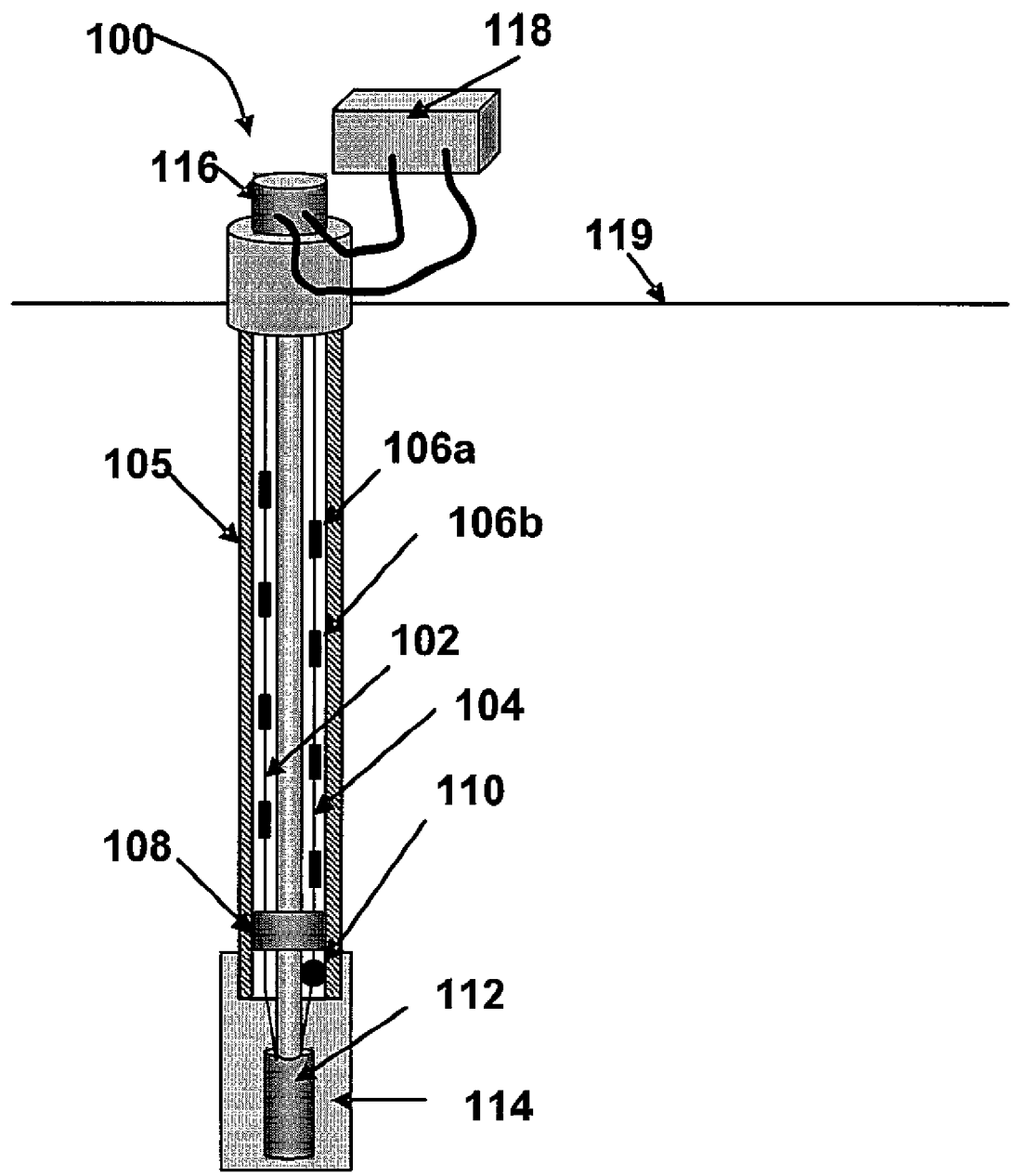
FIG. 1 is a diagrammatic view of a permanent borehole sensor installation according to one embodiment. The principles shown and described in connection with FIG. 1 are also applicable to logging systems or temporary installations.

Throughout the drawings, identical reference numbers and descriptions indicate similar, but not necessarily identical elements. While the principles described herein are susceptible to various modifications and alternative forms, specific embodiments have been shown by way of example in the drawings and will be described in detail herein. However, it should be understood that the principles taught are not intended to be limited to the particular forms disclosed. Rather, the principles cover all modifications, equivalents and alternatives falling within the scope of the appended claims.

DETAILED DESCRIPTION

Illustrative embodiments and aspects are described below. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such a development effort might be complex and time-consuming, but would nevertheless be a routine undertaking for those of ordinary skill in the art having the benefit of this disclosure.

Reference throughout the specification to "one embodiment" or "an embodiment" or "some embodiments" means that a particular feature, structure, or characteristic described in connection with the embodiment is included in at least one embodiment of the present invention. Thus, the appearance of the phrases "in one embodiment" or "in an embodiment" or "in some embodiments" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

As used throughout the specification and claims, the term "downhole" refers to a subterranean environment, particularly in a wellbore and may include an underwater borehole. "Downhole tool" is used broadly to mean any tool used in a subterranean environment including, but not limited to, a logging tool, an imaging tool, an acoustic tool, and a combination tool. The words "including" and "having" shall have the same meaning as the word "comprising."

In some aspects, the present disclosure provides methods and apparatus for powering downhole sensor nodes and efficiently recording subsurface data, which may include seismic data. Some embodiments facilitate power and data transmission to and from downhole sensors in fault conditions.

In subsea well completions, only a few penetrators can be installed through a wellhead. Each penetrator typically passes one electrical connection. The small number of penetrators and electrical connections is a by-product of the difficulty associated with assembling wellheads and christmas trees by remote manipulation from a sea surface. Current remote installation technology does not lend itself to complicated manipulations. Downhole telemetry in subsea systems includes a coaxial cable, for example. The outer tube of the coaxial cable is generally stainless steel or Inconel for corrosion resistance, and therefore DC resistance (and voltage drop) of the outer tube is usually high.

Turning now to the figures, and in particular to FIG. 1, one subterranean sensor system 100 described herein supplies power and transmits data via core conductors of two or more cables such as coaxial cables 102, 104, rather than using one coaxial cable. Typical subterranean systems often use the outer tube of the coaxial cable to complete a power loop. However, according to the embodiment of FIG. 1, current return does not normally use the high resistance outer tube of first coaxial cable 102 and therefore electrical efficiency is high. Nevertheless, as described in more detail below, if there is a fault, the outer tube of first or second coaxial cables 102, 104 may be used for current return. Efficiency is reduced when the outer tube is utilized, however, the system 100 may continue to be fully functional. Instead of the outer tube, a braid shield of a coaxial cable, a drain wire in a quad cable, armor in a quad cable or other conductor member of a cable can be used to complete a power loop. In some embodiments, downhole sensor nodes such as seismic sensor arrays with nodes 106a, 106b are each connected to two or more coaxial cables 102, 104 in series. First and second coaxial cables 102, 104 form a loop. A series connection for the seismic sensor arrays with telemetry modules 106a, 106b means that current is constant along cables 102, 104 unless there is electric leakage. However, according to principles described herein, if there is an electrical leak or fault, all the modules uphole of the fault continue to be powered and all the modules uphole of the fault transmit data normally. In addition, the modules downhole of the fault may switch data transmission (and/or power) to another cable, such as second coaxial cable 104. Accordingly, some embodiments include at least a second or spare cable (e.g. coaxial) 104, but may not include extra connectors.

Moreover, as shown in FIG. 1, the system 100 may include standard components such as wellhead 116 and recorder 118 at surface 119 including a sea floor or a seabed. The system may also comprise packer 108, pressure and/or temperature sensor 110, tilt meter and strain meter 112, and cementing 114 as well. According to the embodiment of FIG. 1, first and second coaxial cables penetrate wellhead 116 and connect to the seismic sensor arrays with nodes 106a, 106b.

Figure 2:
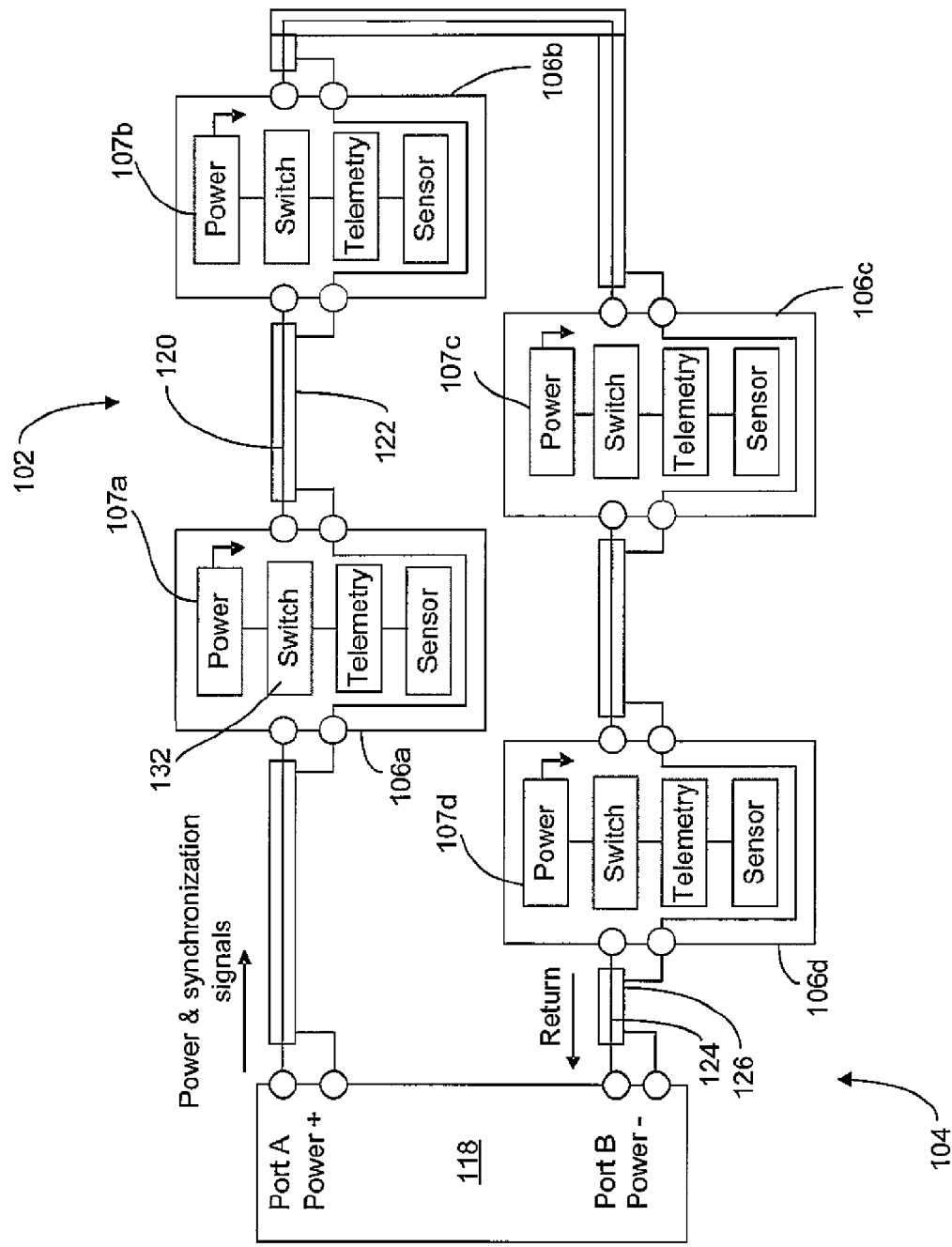
FIG. 2 is an electrical diagram illustrating series power extraction by downhole nodes from a cable and signal delay measurement.
Figure 3:
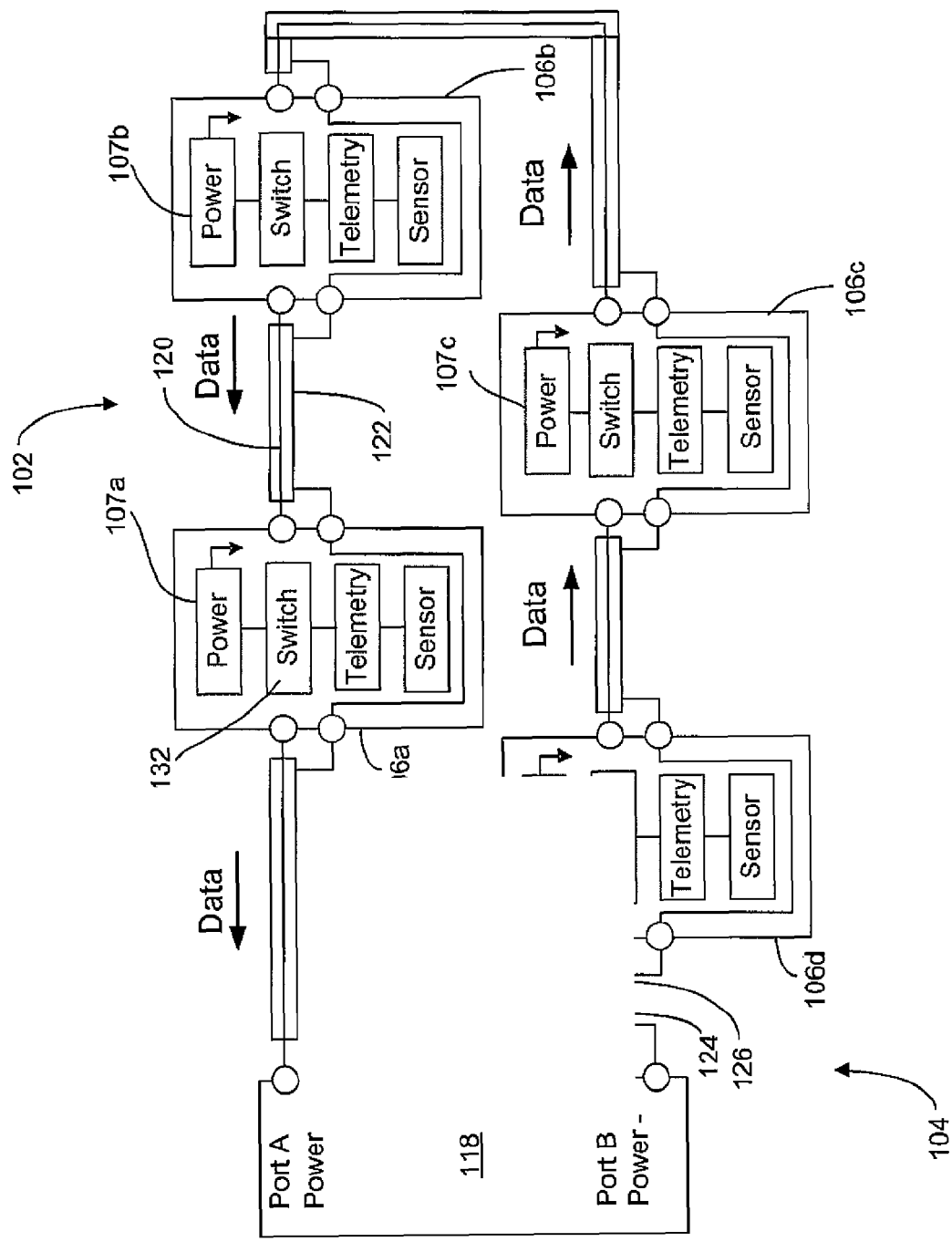
FIG. 3 is an electrical diagram illustrating a dual cable system with series power extraction by downhole nodes and single-direction data transmission.

First and second coaxial cables 102, 104 may form a downhole cable network as shown diagrammatically in FIGS. 2 and 3. As mentioned above, first and second cables 102, 104 form a loop. The seismic sensor arrays with nodes 106a to 106d may comprise permanent sensors or temporary tool-based sensors. In addition, the seismic sensor arrays with nodes 106a to 106d may include one or more switches capable of re-routing power and sensor data transmission. As shown in FIG. 2, first coaxial cable 102 includes first core 120 and first tube 122. Likewise, second coaxial cable 104 includes second core 124 and second tube 126. In some embodiments during normal conditions, first coaxial cable 102 delivers power to the seismic sensor arrays with nodes 106a to 106d in series via the first core 120, and second core 124 of second coaxial cable 102 closes the power loop and functions as a power "return." Specifically, each of the nodes 106a to 106d comprises power extraction 107a to 107d to supply sensors such as the above permanent sensors or temporary tool-based sensors with power therethrough. In addition to providing power, the first core 120 may transmit synchronization signals to nodes 106a to 106d as well.

In FIG. 2, recorder 118 can send synchronization signals from port A in recorder 118 via the first core 120 to all the nodes 106a to 106d, and the synchronization signals can be returned via second core 124 back to port B in recorder 118. Each module receives synchronization signals and trims its own clock frequency and timing for acquisition to match with in-coming synchronization signals, so that all nodes sample signals at the same time. Each node 106 is designed to detect the direction of in-coming synchronization signals and then configures its own switch 132 (which typically includes a plurality of switch elements (not shown)) to send data in the opposite direction of synchronization signals. Each node 106 searches if there is any data received from behind. If not, the node understands that the node is the last node in the network group and initiates sending a data packet.

As shown in FIG. 3, the last node (port B in recorder 118) may send a data packet to the next node 106d and the next node 106d sends received data and its data to the node ahead, as mentioned in detail below. The data from all the nodes 106a to 106d is transmitted to port A in recorder 118 in the opposite direction of synchronization signals. Since recorder 118 knows which data recorder 118 has transmitted from port B in the network, recorder 118 can cross check with its returned data to port A to see if the same data is returned.

The total propagation delay in the cable and nodes 106a to 106d may be measured and used to calibrate synchronization accuracy. The synchronization accuracy may be an important feature in a seismic acquisition system. A desirable synchronization accuracy would be less than 10 micro seconds. However, it is difficult to achieve such accuracy when cable lengths reach several kilometers or more because of the delay in the cable. Accordingly, for a long cable system, there may be a need to calibrate for the cable delay.

The delay of signals at a node is a result of node electronics, namely how long it takes for node electronics to receive and pass signals is known by design. The signal delay in the cable is related to the properties of the cable and its length. Further, cable properties may be a function of temperature. Therefore, it may be desirable to measure cable delay at working conditions.

Figure 4:
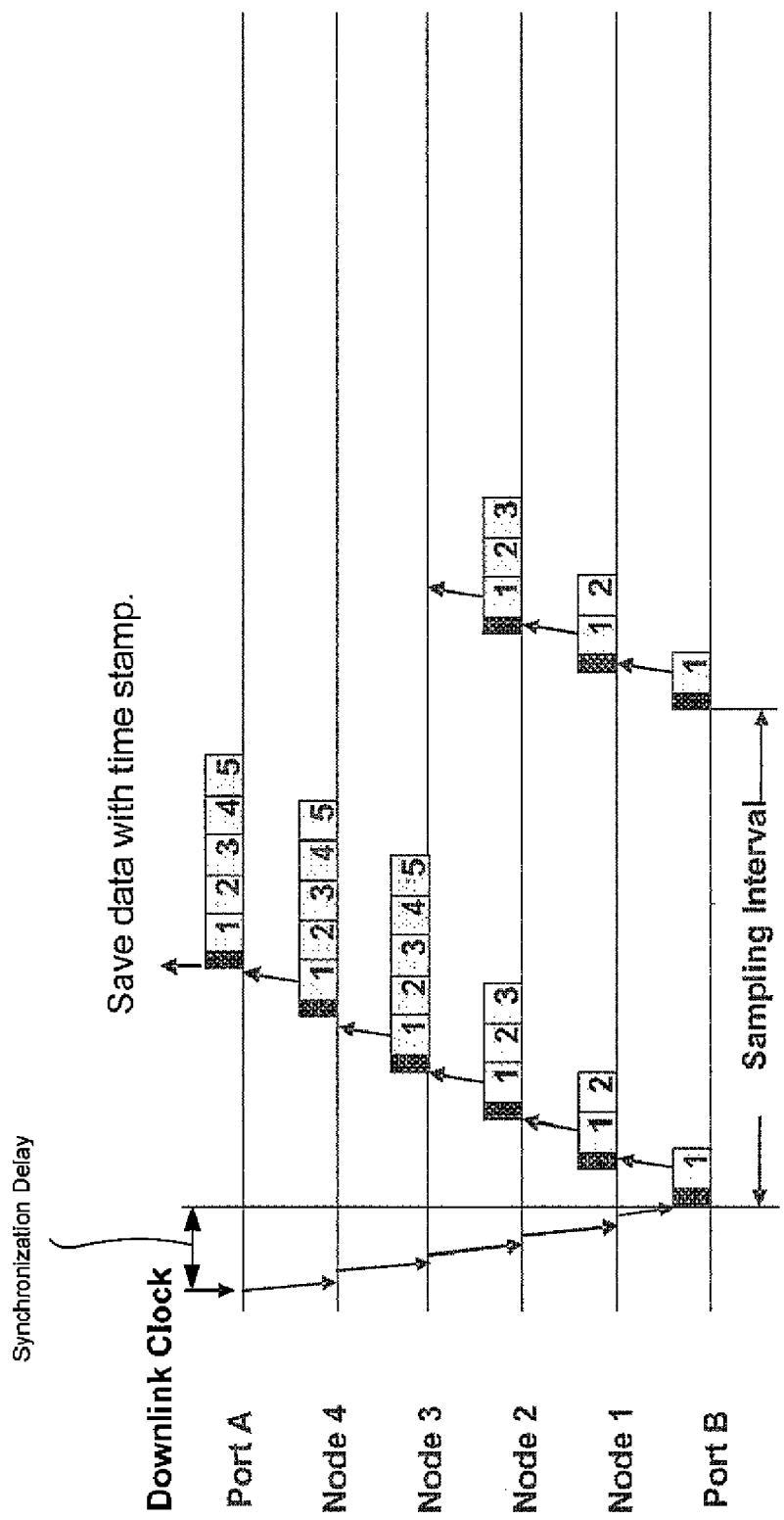
FIG. 4 schematically shows system delay in the diagram of FIG. 2.

FIG. 4 schematically shows telemetry system delay in the electrical diagrams of FIGS. 2 and 3. Firstly, port A, which is placed in a recorder, sends a command and/or synchronization signal to port B which is conventionally placed in another recorder. After port B receives the command and/or synchronization signal, port B starts sending data to downhole nodes at every sampling time. In this, the data is then appended at each node and eventually returned to port B. Typically, electronics of each node causes a fixed delay at each node because of repeated data. Each cable in the diagram also causes propagation delay depending on length. The fixed delay in the electronics can be compensated based on the number of the nodes. The propagation delay in the cable needs to be measured. According to the present embodiment, however, since both port A and port B are placed in the same recorder 118, shown in FIG. 2, the recorder can count timing between sending synchronization signals from port A and receiving signals at port B by using the same clock in recorder 118.

In a loop topology embodiment shown in FIGS. 2 and 3, a master synchronization signal may be sent from recorder 118 to an adjacent node. This synchronization signal propagates in all cables and nodes and eventually comes back to recorder 118. Since recorder 118 can measure the timing for sending and receiving synchronization signals, the total delay DT of the whole system is:

$$DT = n*Tnode + Tc*TL$$

where n is the number of nodes, Tnode is the time delay at a node, Tc is the cable delay in unit length and TL is the total length of the cable in the system.

Then the cable delay in a unit length of cable is estimated as:

$$Tc = (DT - n*Tnode)/TL$$

The delay, DTi in each cable section is:

$$DT(i) = Tc*CL(i)$$

where CL(i) is the cable length in the cable section i. If the delays in each cable section are known, the synchronization delay can be compensated.

As mentioned above, from the total delay, the delay in each section is calculated in the same manner described above. Accordingly, synchronization can be calibrated for cable delay.

FIGS. 2 and 3 illustrate series power extraction by the seismic sensor arrays with nodes 106a to 106d—and cable delay measurement—in one direction. However, sensor data can be sent in different directions, which may increase data transmission rates (not shown).

Node 106b, for example, may be set to initiate data transmission. This initiation can be done, for example, by not passing the synchronization signals to the nodes beyond. Node 106b sends data to node 106a, which appends data and sends the data to port A in recorder 118. In this case, nodes 106c and 106d are "asleep". Port B sends synchronization signals via second core 124 to nodes 106c and 106d. Then nodes 106c and 106d start sending data to port B in recorder 118.

The cable networks shown in FIGS. 2 and 3 may be used subsea. Subsea cable networks, however, are susceptible to water leaks. Water leakage can cause a fault or short circuit. Therefore, according to some embodiments, one or more switches 132 of the seismic sensor arrays with telemetry nodes 106a to 106d are programmed to redirect data transmission in the event of a fault such as a first fault 130 shown in FIG. 5. The first fault 130 of FIG. 5 is shown between a pair of adjacent seismic sensor arrays with nodes 106a to 106d.

In order to power and collect data from all of the seismic sensor arrays with nodes 106a to 106d in the event of the first fault 130, power may be sent downhole via each of first and second coaxial cables 102, 104. Power from first coaxial cable 102 may be delivered via the first core 120 and returned or looped via first tube 122 for all of the seismic sensor arrays with nodes 106a to 106d arranged uphole of first fault 130. Similarly, power from second coaxial cable 104 may be delivered via second core 124 and returned via second tube 126 for all of the seismic sensor arrays with nodes 106a to 106d downhole of first fault 130. The efficiency of power delivery will decrease if first and second tubes 122, 126 with high resistance are utilized to close first and second power loops, respectively, but data can continue to be collected from each of the seismic sensor arrays with nodes 106a to 106d. In addition, if first fault 130 is detected, switches 132 may be programmed to route data uphole from each seismic sensor array with nodes 106a to 106d via the same core that power is delivered.

Figure 5:
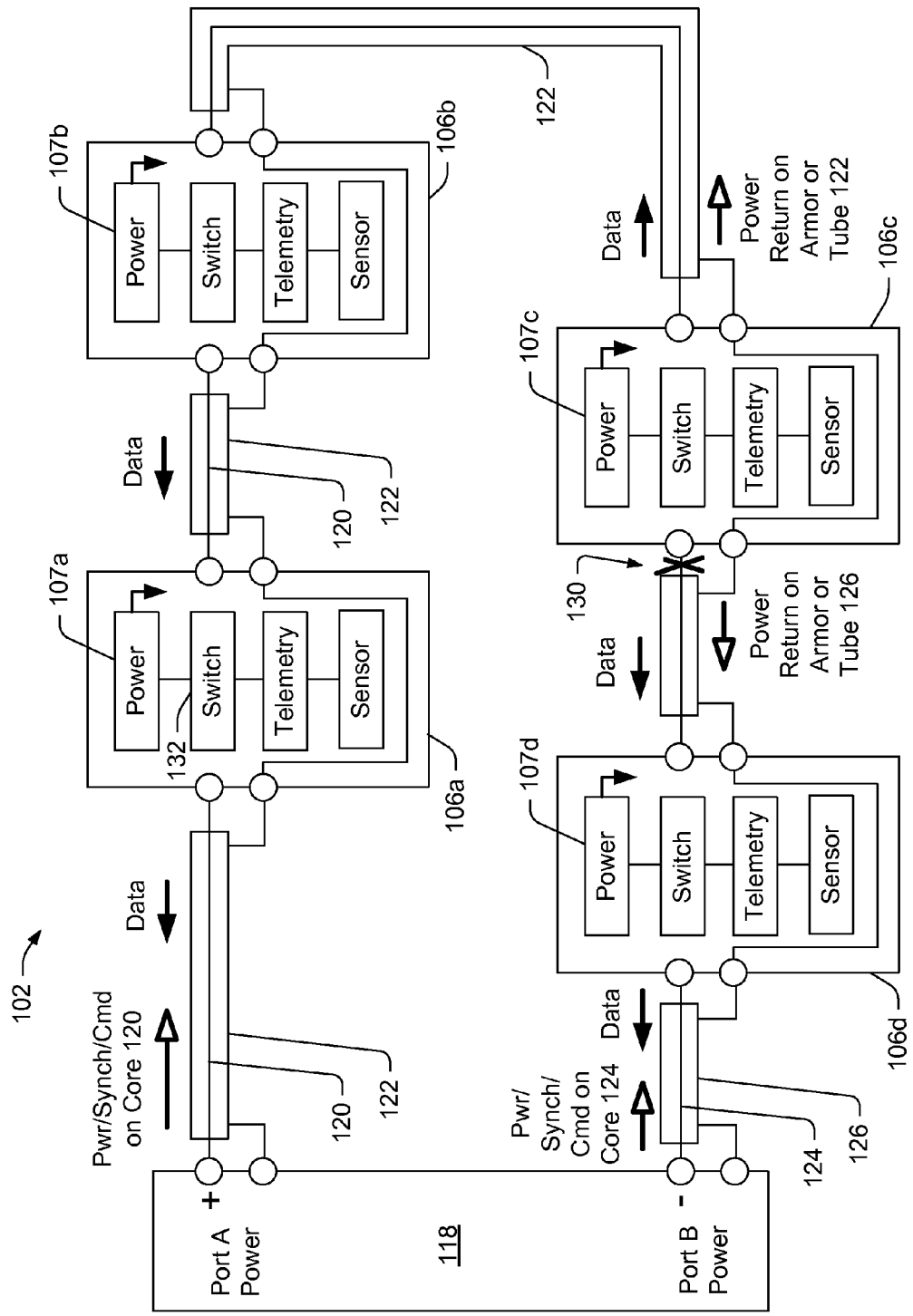
FIG. 5 shows the electrical diagram of FIG. 2 including power and data transmission under a fault condition.
Figure 6:
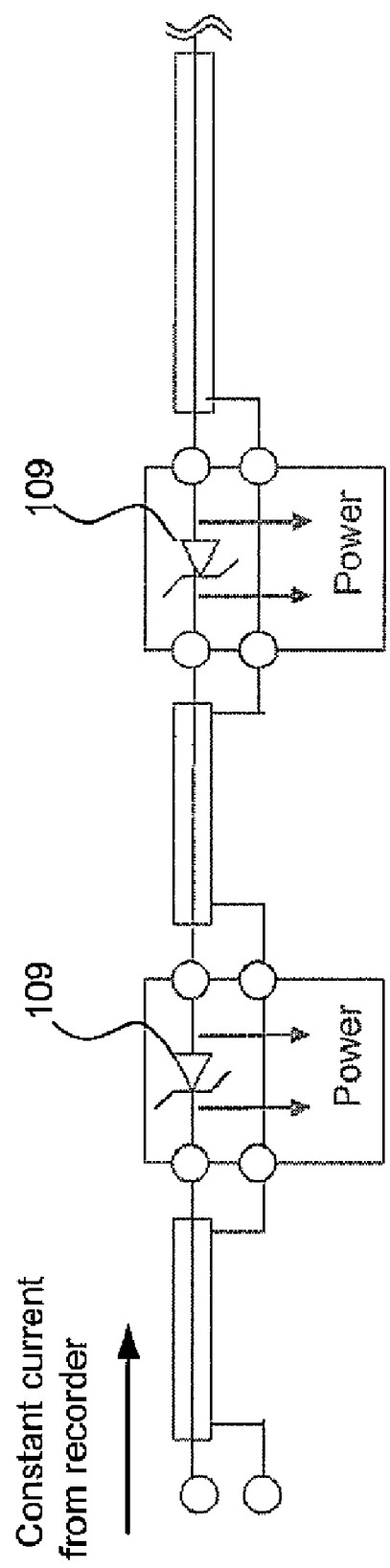
FIG. 6 schematically shows one embodiment of power extraction in a node of FIG. 3.

For example, as shown in FIG. 5, all of the data from the seismic sensor arrays with nodes 106a to 106c uphole of fault 130 is routed to port A in recorder 118 via first core 120, and all of the data from the seismic sensor arrays with node 106d downhole of fault 130 is routed to port B in recorder 118 via the second core 124. Generally, if recorder 118 can send a voltage of $+/-E_0$, each node ideally takes a voltage of $2*E_0/n$, where n is the total number (n=4 for FIG. 5 and the design voltage at a node is $E_0/2$) of nodes 106a to 106d connected to recorder 118 under normal condition because it is assumed that there are no voltage drops along cables 102, 104. However, under the water leakage condition of FIG. 5, a voltage value at node 3 becomes zero (ground). As a result, each of nodes 106a to 106c would receive $E_0/3$ that is rather small from design voltage. Also, node 106d would receive $E_0$ that is twice the design voltage. It may be difficult to design the node electronics to work under such a wide range of line voltage. Therefore, it is desired that a node extract constant voltage from the line even under water leakage condition. The power extraction may be made at constant voltage by making the recorder power supply to a constant current. In this case, as shown in FIG. 6, power extraction 107 preferably includes Zener diode 109, which is used to stabilize or regulate a voltage at a constant voltage.

Figure 7:
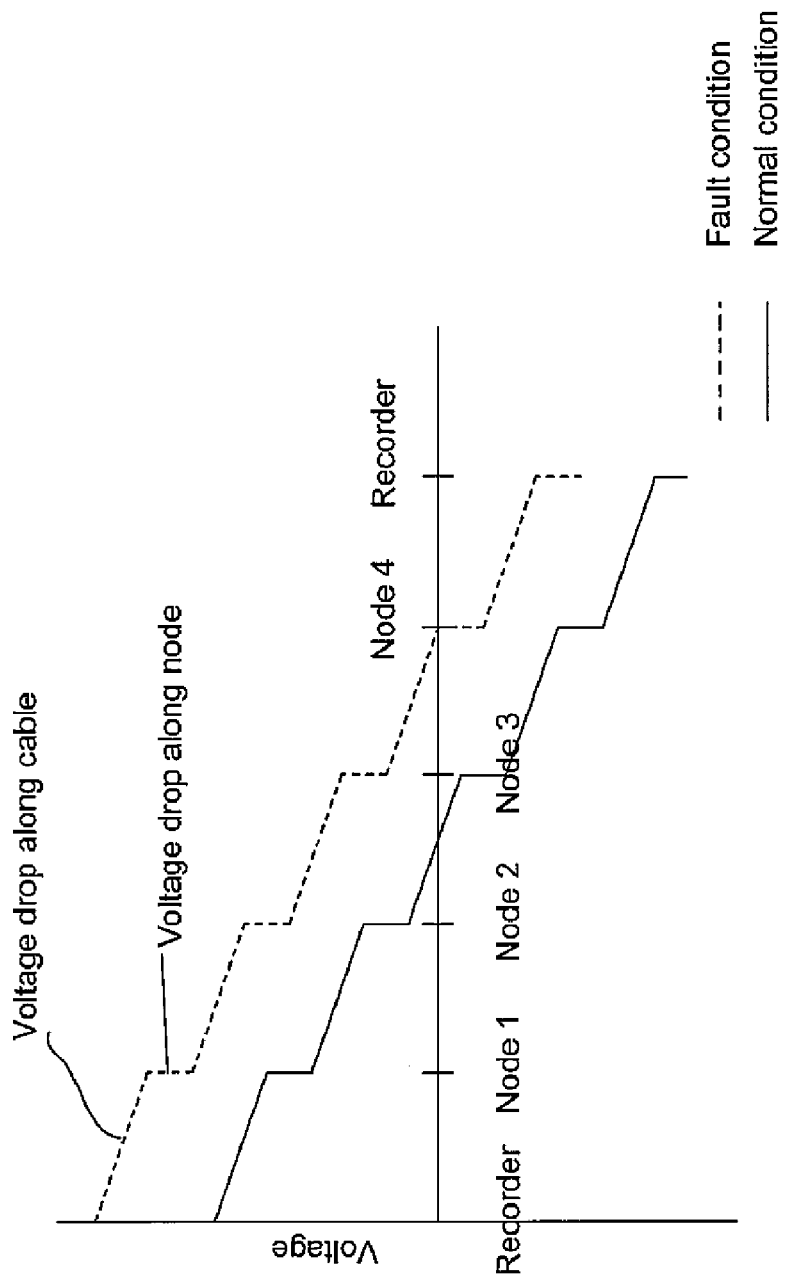
FIG. 7 schematically shows voltage profile along a cable of the electrical diagram of FIG. 2 under a normal condition and a fault condition for a constant current power delivery.

FIG. 7 schematically shows a more practical voltage profile along a cable with a constant current power delivery in the electrical diagram of FIG. 2 under a normal condition and a fault condition. As shown in FIG. 7, there are voltage drops along a cable because of resistance of the cable. Also, each of the nodes 106a to 106d extracts the same voltage. If there is a leakage at node 106c as shown in FIG. 5, recorder 118 supplies a higher voltage from port A and a smaller negative voltage from port B to maintain constant current. Thus, a voltage at each node 106a to 106d stays constant for reliable or stable electrical functionalities.

Figure 8:
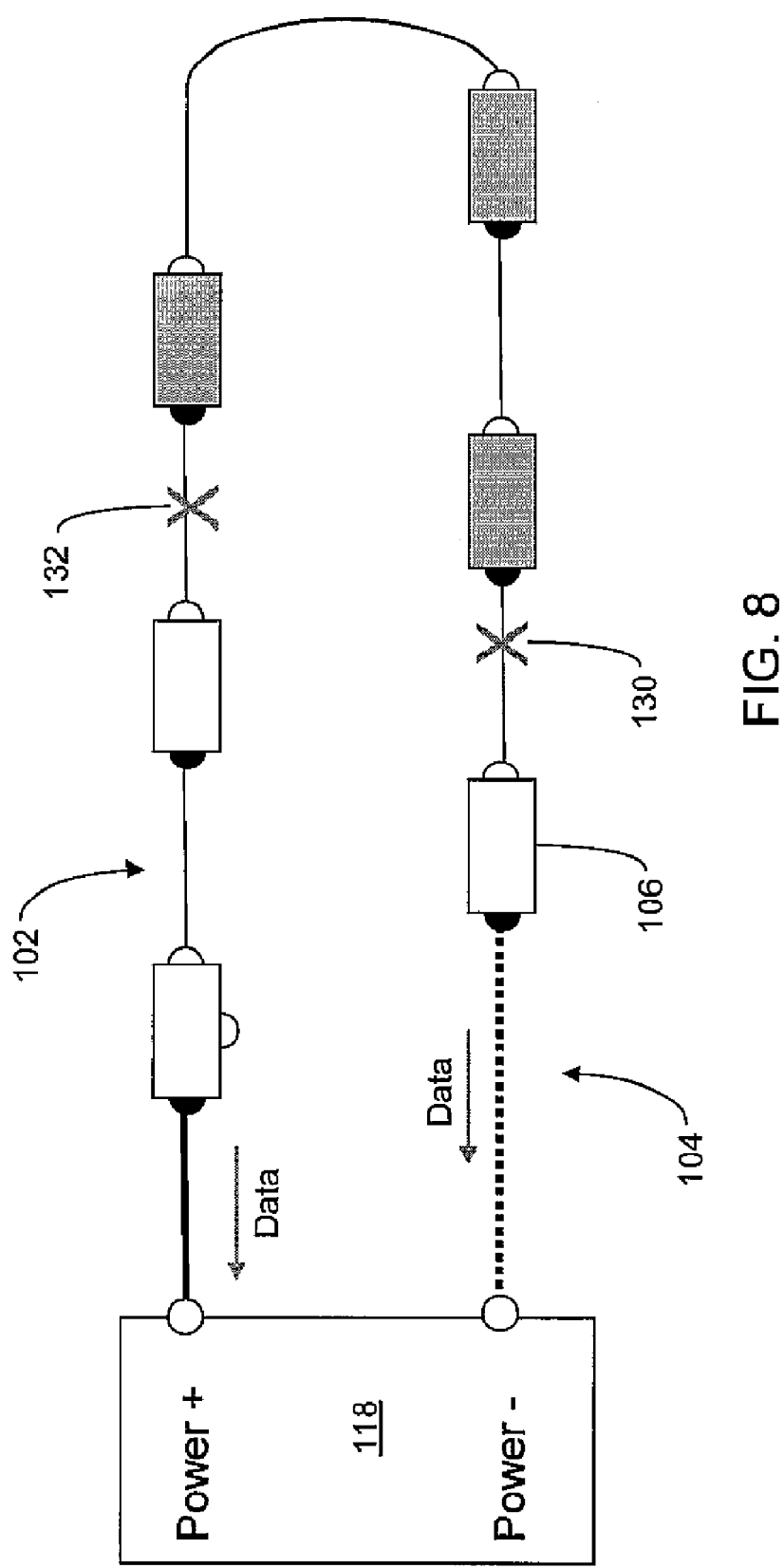
FIG. 8 shows the electrical diagram of FIG. 2 including power and data transmission with two faults.

The network arrangement of FIG. 5 facilitates full operation of the seismic sensor arrays with nodes 106 when there is one fault. Two or more faults may introduce additional complications. For example, as shown in FIG. 8, even using both first and second coaxial cables 102, 104 will not allow full operation of the downhole cable network. If the network includes both first fault 130 and second fault 132, none of the seismic sensor arrays with nodes arranged between first and second faults 130, 132 will be operational.

Figure 9:
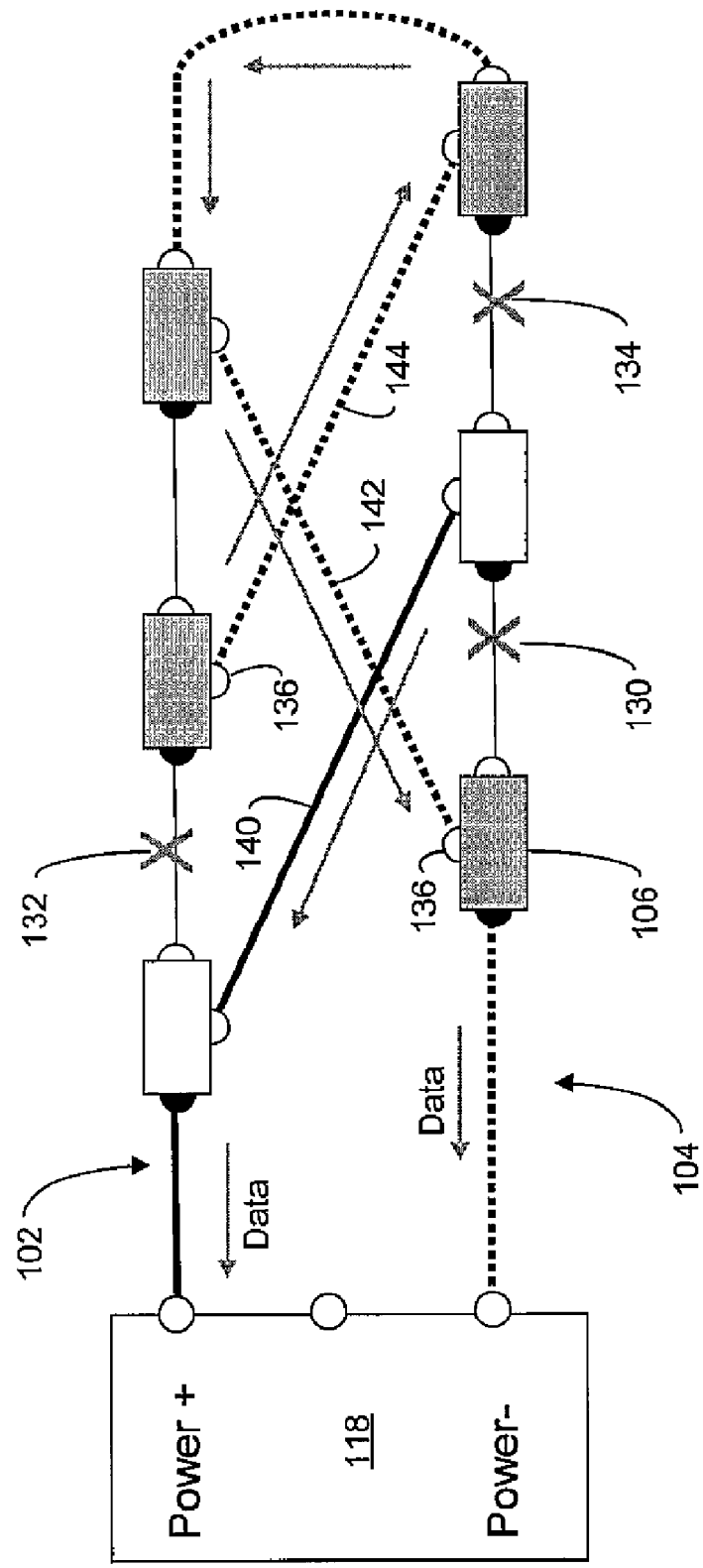
FIG. 9 is an electrical diagram illustrating a dual cable system with multiple inter-node connections.

Therefore, according to some embodiments there may be an additional cable connection between at least two non-adjacent seismic sensor arrays with telemetry modules 106 as shown in FIG. 9. Additional switches 136 at two or more of the seismic sensor arrays with nodes 106 may redirect power and data transmission when multiple faults are detected. With the right interconnections between non-adjacent nodes, even a third fault 134 or others may not render any of the seismic sensor arrays with nodes 106 inoperable. Some embodiments may include at least four, at least six, or more cable connections between non-adjacent nodes that are selectively connectable by switches 136 to route power and data transmission to/from the recorder and the nodes. For example, FIG. 9 illustrates third, fourth, and fifth cables 140, 142, 144 and associated connections between seismic sensor arrays with nodes 106.

Figure 10:
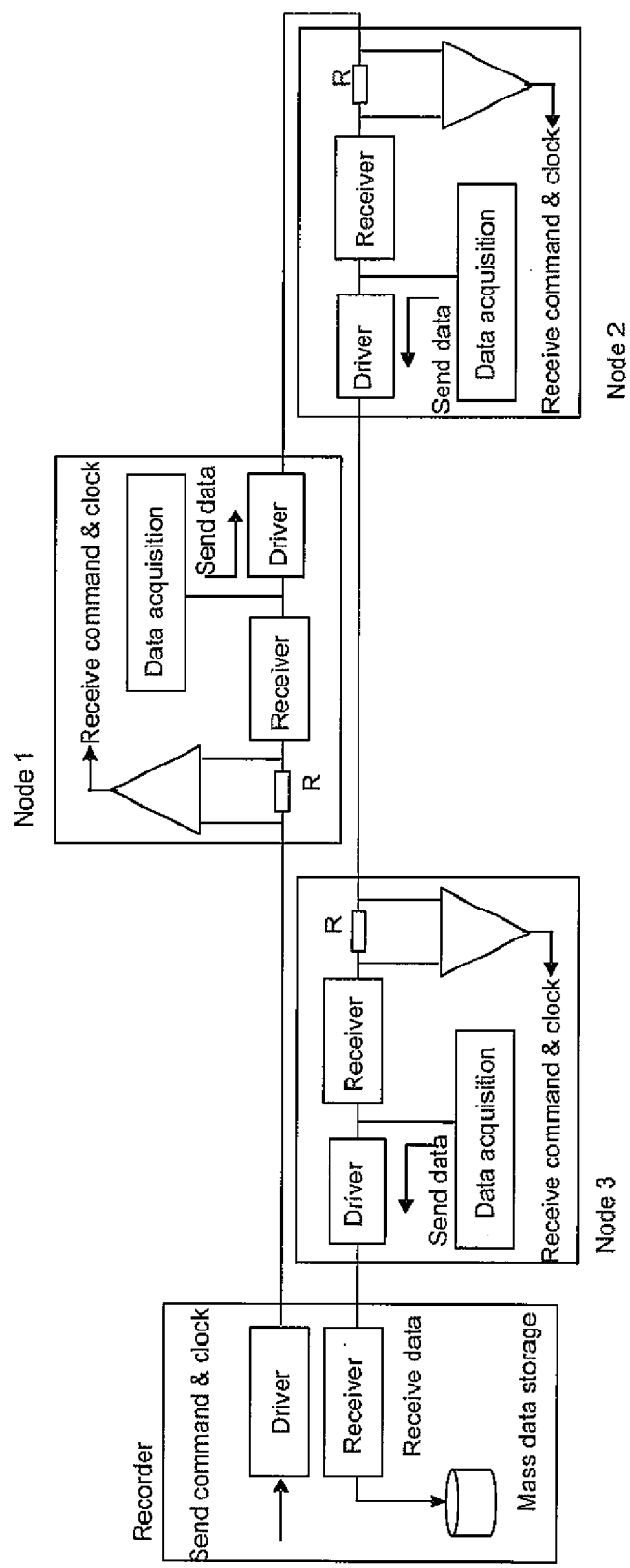
FIG. 10 illustrates a serial command extraction diagram.

FIG. 10 illustrates serial command extraction in a loop embodiment. As shown in FIG. 10, a recorder sends a command and/or synchronization signal at low frequency to downhole nodes (Node 1, Node 2, Node 3). The command and/or synchronization signal may be sent at low frequency and/or high amplitude to overcome attenuation. Each node (e.g. Node 1, Node 2, Node 3, etc.) extracts the command and/or synchronization signal in series via a resistor R or a choke coil. Therefore, each node can receive command and/or synchronization signal even if there is a leakage. In contrast, if command/synchronization signal extractions in the whole network system are in parallel, a leakage causes short circuit to the whole system and no node can receive command and/or synchronization signal and all nodes do not send data to the recorder.

Figure 11A:
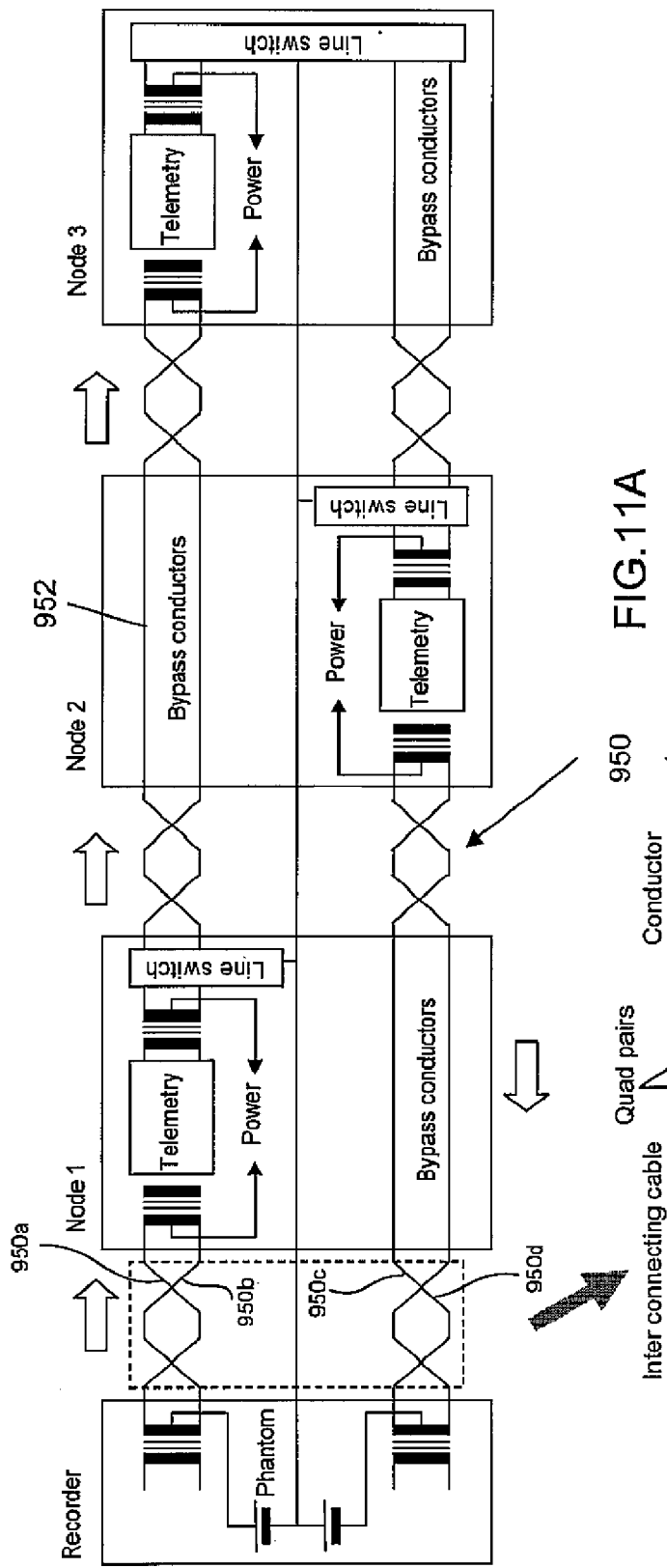
FIG. 11A illustrates the line topology shown in FIG. 10 for a wireline loop embodiment.
Figure 11B:
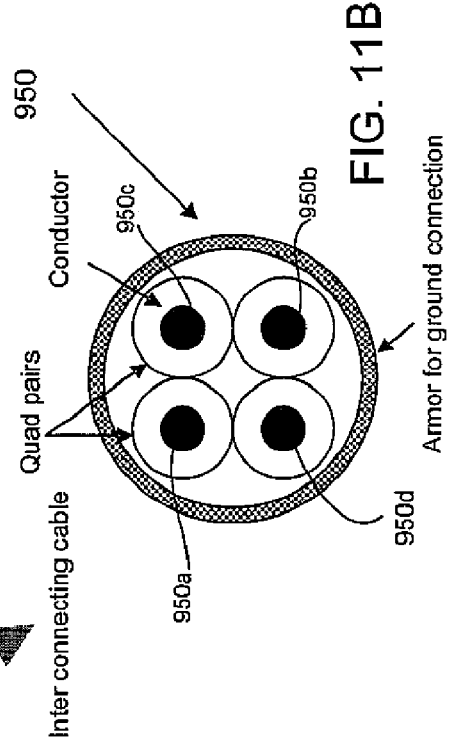
FIG. 11B is a magnified cross-section of the quad cable shown in FIG. 11A.
Figure 12:
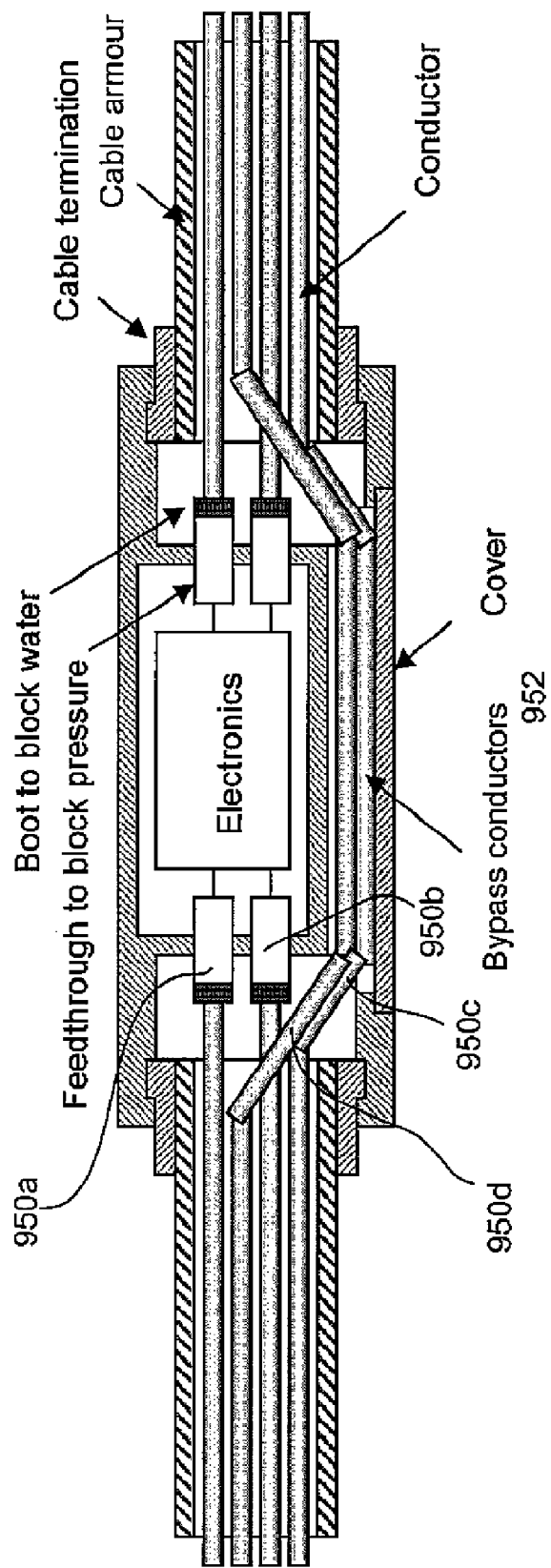
FIG. 12 illustrates an enlarged, partial cross sectional view of the bypass conductors of FIG. 11A according to one embodiment.

The downhole to subsea topology shown and described above may be extended to wireline applications as mentioned. FIGS. 11A, 11B, and 12 illustrate one embodiment of a single cable system suitable for wireline applications. As described in more detail below, the looped cables may be integrated into a single physical wireline retaining loop feature.

FIG. 11A illustrates the line topology shown in FIG. 10 for a wireline loop embodiment. FIG. 11B is a magnified cross-section of the interconnecting cable shown in FIG. 11A. The loop telemetry topology shown in FIG. 11A can form a line topology using two twisted pairs in a cable or quad cable 950 as shown in FIG. 11B instead of the above-mentioned coaxial cable. Quad cable 950 is suited for wireline, land, or seabed applications for a better packing density and improved crosstalk suppression. If quad cable 950 is used to form the line topology of FIG. 11A, a first pair of conductors 950$a$ and 950$b$ in quad cable 950 are connected to telemetries or electronics of Node 1 and Node 3 through Node 2. A second pair of conductors 950$c$ and 950$d$ are connected to telemetry or electronics of Node 2 through Node 1 and Node 3. In this case, the first pair of conductors 950$a$ and 950$b$ are bypass conductors 952 in Node 2. Also, the second pair of conductors 950$c$ and 950$d$ are bypass conductors 952 in Node 1 and Node 3. Therefore, the line topology of FIG. 11A can be formed by the single quad cable 950. The conductors 950$a$ to 950$d$ are covered with an armor, which comprises a power return and closes the loop to the recorder in a fault condition, as well as the above mentioned tube, braid shield, etc.

One embodiment of bypass conductors 952 shown in FIG. 11A are detailed in partial cross-section in FIG. 12. In the embodiment of FIG. 12, the bypass conductors 952 do not have to go into a pressure tight housing. Instead bypass conductors 952 may go around outside the pressure tight housing for the electronics. Feedthrus or connectors into pressure tight housings can be unreliable, and therefore bypass conductors 952 do not necessarily (although they could) go through any pressure tight housing. In addition, if the first pair of conductors 950$a$ and 950$b$ are isolated from the second pair of conductors 950$c$ and 950$d$ (i.e., the bypass conductors 952), electric leakage may be effectively reduced between these two pairs.

Figure 13A:
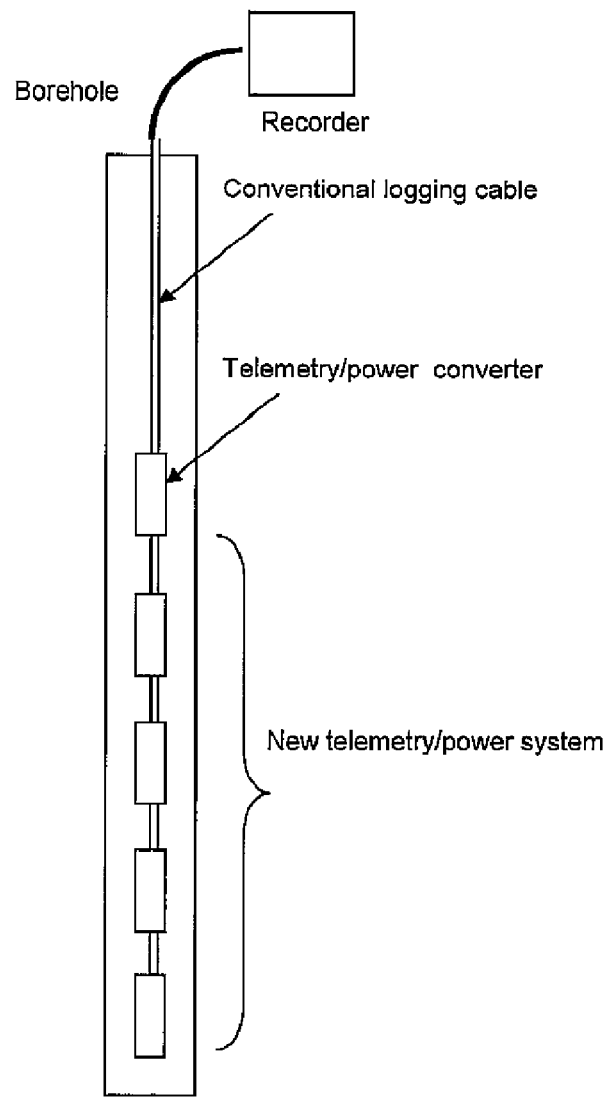
FIGS. 13A-13B show borehole and land/sea bed telemetry loops, respectively, according to some embodiments.
Figure 13B:
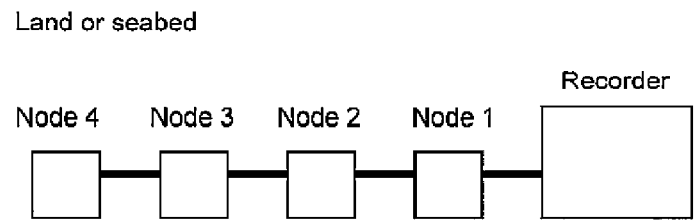

Referring next to FIGS. 13A and 13B, since loop telemetry taught and described herein can be made using one cable, the methods and systems described can be applied to data acquisition for conventional boreholes, land, and seabed. FIG. 13A represents a borehole, and FIG. 13B represents land or seabed. The loop systems described herein can be connected via conventional wireline cable by converting the power and telemetry connections.

The arrangement of downhole sensors and power/data transmission networks shown and described above are not limited to permanent installations. Transient downhole tools such as logging tools and other apparatus may also benefit from the principles described herein related to power and data transmission. The preceding description has been presented only to illustrate and describe the invention and some examples of its implementation. It is not intended to be exhaustive or to limit the invention to any precise form disclosed. Many modifications and variations are possible in light of the above teaching. For example, the present invention is not limited to subsea and can be applied to downhole or land applications.

What is claimed is:

1. A remote sensing system, comprising:
   a recorder configured to adjust voltages at a first port and a second port to supply a level of current;
   a cable network, the cable network comprising:
      a first cable configured for connection to the first port;
      a second cable configured for connection to the second port and configured for electrical connection to the first cable;
      a plurality of downhole sensor nodes, each of the sensor nodes configured to derive a voltage from current supplied by the recorder;
   wherein, for a ground fault configuration of the first cable or the second cable, to maintain a sufficient level of current, the recorder adjusts voltages at the first port and the second port.

2. A remote sensing system according to claim 1, wherein:
   each of the first and second cables comprise cables including at least one core configured to carry current.

3. A remote sensing system according to claim 2, wherein:
   each of the first and second cables further comprising a conductor member.

4. A remote sensing system according to claim 1, wherein:
   the plurality of downhole sensor nodes comprise one or more switches capable of re-routing power and data transmission.

5. A remote sensing system according to claim 4, wherein:
   the switches of the nodes are operable to direct data transmission in one or more directions.

6. A remote sensing system according to claim 4, wherein:
   the switches of the nodes direct data transmission along the first and second cables from the nodes to the recorder in parallel.

7. A remote sensing system according to claim 4, wherein:
   the switches of each of the plurality of downhole sensor nodes are programmed to complete a power circuit via a single one of the cables and to send data in a direction opposite of a command and/or synchronization signal if a fault is detected between nodes.

8. A remote sensing system according to claim 4, further comprising:
   cable connections between at least two non-adjacent nodes selectively connectable by the switches to route current and data transmission in the event of multiple faults.

9. A remote sensing system according to claim 4, further comprising cable connections between at least four non-adjacent nodes selectively connectable by the switches to route current and data transmission in the event of multiple faults.

10. A remote sensing system according to claim 1, wherein the sensor nodes each comprise a permanent seismic sensor and a telemetry module.

11. A remote sensing system according to claim 2, wherein the first and second cables comprise a quad cable, and the at least one core of the first and second cables are isolated from each other.

12. A remote sensing system, comprising:
    a wellhead;
    a recorder configured to adjust voltages at a first port and a second port to supply a level of current;
    a cable network penetrating the wellhead, the cable network comprising:
       a first telemetry and power cable configured for connection to the first port;

a second telemetry and power cable configured for connection to the second port and configured for electrical connection to the first telemetry and power cable;
a plurality of downhole nodes, each of the nodes comprising a seismic sensor and a telemetry module connected to the cable network and each of the nodes configured to derive a voltage from current supplied by the recorder;
wherein, for a ground fault configuration of the first cable or the second cable, to maintain a sufficient level of current, the recorder adjusts voltages at the first port and the second port.

13. A remote sensing system according to claim 12, wherein the plurality of downhole nodes comprise one or more switches capable of altering a current loop configuration and changing data transmission routing from the seismic sensor.

14. A remote sensing system according to claim 13, wherein the current is transmitted along the first telemetry and power cable to the plurality of downhole nodes and the switches are programmed to close the current loop via the second telemetry and power cable under normal operating conditions.

15. A remote sensing system according to claim 13, wherein the current is transmitted along both the first and second telemetry and power cables to the plurality of downhole nodes and the switches are programmed to close a first current loop of the first telemetry and power cable and close a second current loop of the second telemetry and power cable in the event of a fault between adjacent downhole nodes.

16. A remote sensing system according to claim 13, wherein the switches are programmed to route seismic sensor data from the telemetry modules via the first and second telemetry and power cables in a direction opposite of a command and/or synchronization signal.

17. A remote sensing system according to claim 13, further comprising:
cable connections between at least two non-adjacent downhole nodes selectively connectable by the switches to re-route current and data transmission in the event of multiple faults between nodes.

18. A remote sensing system according to claim 13, further comprising:
third and fourth telemetry and power cables connected between at least four non-adjacent downhole nodes selectively connectable by the switches to route current and data transmission in the event of multiple faults between nodes.

19. A remote sensing system according to claim 12, wherein current and synchronization signals are delivered downhole together.

20. A method of providing power and data transmission in a remote sensing system, comprising:
delivering current downhole to a plurality of nodes arranged in series along a first cable;
monitoring for faults between adjacent nodes;
if there are no faults detected: closing a first current loop via a second cable connected to the nodes;
if there is one fault detected between adjacent nodes: closing the first current loop via the first cable at the fault; delivering current downhole to some of the plurality of nodes with the second cable; closing a second current loop via the second cable at the fault;
wherein the delivering current with the first cable and the second cable delivers a sufficient level of current based on adjusting a voltage associated with the first cable and adjusting a voltage associated with the second cable and wherein each of the nodes comprises circuitry configured to derive a voltage from delivered current.

21. A method of providing power and data transmission in a remote sensing system according to claim 20, wherein:
if there are no faults detected: transmitting data uphole in parallel via the first and second cables;
if there is one fault detected between adjacent nodes: transmitting data from the nodes proximal of the fault uphole via the first cable, and transmitting data from the nodes distal of the fault uphole via the second cable.

22. A method of providing power and data transmission in a remote sensing system according to claim 20, wherein:
if there are no faults detected: transmitting data uphole in series in a single direction opposite the direction of a command and/or synchronization signal via the first and second cables.

23. A method of providing power and data transmission in a remote sensing system according to claim 20, further comprising:
connecting non-adjacent nodes with at least one cable;
wherein: if there are faults detected between two or more different sets of adjacent nodes: switching node connections to interconnect non-adjacent nodes with at least one of the first cable and the second cable;
re-routing current and data transmission around each fault.

24. A method of measuring propagation delay in a remote sensing system, comprising:
providing a recorder configured to adjust voltages at a first port and a second port to supply a sufficient level of current to a cable network;
providing the cable network, the cable network comprising a first cable configured for connection to the first port and a second cable configured for connection to the second port;
providing a plurality of downhole sensor nodes, each of the sensor nodes configured to derive a voltage from current supplied by the recorder;
connecting the recorder and the plurality of downhole sensor nodes to the cable network in series;
closing a loop to the recorder by the first cable;
measuring start time for sending data to the plurality of downhole sensor nodes from the recorder;
measuring arrival time for the sent data to return to the recorder;
calculating the propagation delay using the start time and the arrival time.

25. A method of measuring propagation delay in a remote sensing system according to claim 24, further comprising estimating cable delay in a unit length of cable by: $DT(i)=Tc*CL(i)$ where:
DT(i) is cable delay in a cable section i;
CL(i) is cable length in the cable section i; and
Tc is cable delay in a unit length, which is defined as $(DT-n*Tnode)/TL$ where:
n is the number of nodes;
Tnode is time delay at a node, and
TL is total cable length in the system.

* * * * *